United States Patent [19]
Doi et al.

[11] Patent Number: 5,887,130
[45] Date of Patent: Mar. 23, 1999

[54] INFORMATION PROCESSING APPARATUS, INFORMATION PROCESSING METHOD, DATA RECORDING MEDIUM, AND INFORMATION PROCESSING SYSTEM

[75] Inventors: Toshitada Doi; Yoshitomo Osawa, both of Kanagawa, Japan

[73] Assignee: Sony Corporation, Tokyo, Japan

[21] Appl. No.: 760,229

[22] Filed: Dec. 4, 1996

[30] Foreign Application Priority Data

Dec. 5, 1995 [JP] Japan .................................. 7-316748

[51] Int. Cl.⁶ .................................................. G06F 11/00
[52] U.S. Cl. ........................................................ 395/186
[58] Field of Search .............................. 395/186, 188.01, 395/187.01, 200.57, 200.68, 200.69, 200.71, 200.7, 200.72, 200.73, 182.02; 380/3, 4, 23, 25; 701/163, 164

[56] References Cited

U.S. PATENT DOCUMENTS

| | | | |
|---|---|---|---|
| 4,788,543 | 11/1988 | Rubin | 340/825.44 |
| 4,926,478 | 5/1990 | Gruenberg | 380/21 |
| 5,233,655 | 8/1993 | Shapiro | 380/23 |
| 5,363,446 | 11/1994 | Rupperts et al. | 380/4 |
| 5,371,897 | 12/1994 | Brown et al. | 395/800 |
| 5,446,744 | 8/1995 | Nagasawa et al. | 371/37.4 |
| 5,509,050 | 4/1996 | Berland | 379/58 |
| 5,524,072 | 6/1996 | Labaton et al. | 380/24 |
| 5,528,284 | 6/1996 | Iwami et al. | 358/13 |
| 5,537,532 | 7/1996 | Chng et al. | 395/182.02 |
| 5,553,144 | 9/1996 | Almquist et al. | 380/25 |
| 5,565,992 | 10/1996 | Enari | 358/261.3 |
| 5,590,124 | 12/1996 | Robins | 370/258 |
| 5,619,571 | 4/1997 | Sandstrom et al. | 395/188.01 |
| 5,630,059 | 5/1997 | Brady et al. | 395/200.01 |
| 5,638,448 | 6/1997 | Nguyen | 380/29 |
| 5,649,185 | 7/1997 | Antogini et al. | 395/609 |
| 5,668,945 | 9/1997 | Ohba et al. | 39/186 |
| 5,671,281 | 9/1997 | Campbell et al. | 380/25 |
| 5,694,469 | 12/1997 | Le Rue | 395/186 |
| 5,745,568 | 4/1998 | O'Connor et al. | 380/4 |

*Primary Examiner*—Joseph E. Palys
*Attorney, Agent, or Firm*—Frommer Lawrence & Haug, LLP.; William S. Frommer

[57] ABSTRACT

An improvement in protecting information transmitted via a network from illegal copying is disclosed. While data input from an information provider via a network is stored in a storage device, an ID inherent in an information terminal unit stored in a ROM, the time information which is output from a real-time clock counter, an ID of the owner of an ID card read by a card reader are multiplex-recorded as identification information on the input data. Identification information is also multiplex-recorded on the data read from the storage device and to be output through the output terminal.

2 Claims, 18 Drawing Sheets

FIG. 10A

| VLC | LUMINANCE-SIGNAL DC-COMPONENT SIZE |
|---|---|
| 1 0 0 | 0 |
| 0 0 | 1 |
| 0 1 | 2 |
| 1 0 1 | 3 |
| 1 1 0 | 4 |
| 1 1 1 0 | 5 |
| 1 1 1 1 0 | 6 |
| 1 1 1 1 1 0 | 7 |
| 1 1 1 1 1 1 0 | 8 |

FIG. 10B

| VLC | COLOR-DIFFERENCE-SIGNAL DC-COMPONENT SIZE |
|---|---|
| 0 0 | 0 |
| 0 1 | 1 |
| 1 0 | 2 |
| 1 1 0 | 3 |
| 1 1 1 0 | 4 |
| 1 1 1 1 0 | 5 |
| 1 1 1 1 1 0 | 6 |
| 1 1 1 1 1 1 0 | 7 |
| 1 1 1 1 1 1 1 0 | 8 |

FIG. 11

| EXAMPLE WHEN DCT DC-COMPONENT SIZE IS 3 ||
|---|---|
| DCT DC DIFFERENTIAL | DCT zz (0) |
| 0 0 0 | −7 |
| 0 0 1 | −6 |
| 0 1 0 | −5 |
| 0 1 1 | −4 |
| 1 0 0 | 4 |
| 1 0 1 | 5 |
| 1 1 0 | 6 |
| 1 1 1 | 7 |

FIG. 12

| 1 | 2 | 3 | 4 | 5 | | n−1 | n |
|---|---|---|---|---|---|---|---|
| 1 | 0 | 1 | 1 | 0 | ------ | 1 | 0 |

FIG. 20

| VARIABLE LENGTH CODE | MOTION CODE [r] [s] [t] |
|---|---|
| 0000 0011 001 | −16 |
| 0000 0011 011 | −15 |
| 0000 0011 101 | −14 |
| 0000 0011 111 | −13 |
| 0000 0100 001 | −12 |
| 0000 0100 011 | −11 |
| 0000 0100 11 | −10 |
| 0000 0101 01 | −9 |
| 0000 0101 11 | −8 |
| 0000 0111 | −7 |
| 0000 1001 | −6 |
| 0000 1011 | −5 |
| 0000 111 | −4 |
| 0001 1 | −3 |
| 0011 | −2 |
| 011 | −1 |
| 1 | 0 |
| 010 | 1 |
| 0010 | 2 |
| 0001 0 | 3 |
| 0000 110 | 4 |
| 0000 1010 | 5 |
| 0000 1000 | 6 |
| 0000 0110 | 7 |
| 0000 0101 10 | 8 |
| 0000 0101 00 | 9 |
| 0000 0100 10 | 10 |
| 0000 0100 010 | 11 |
| 0000 0100 000 | 12 |
| 0000 0011 110 | 13 |
| 0000 0011 100 | 14 |
| 0000 0011 010 | 15 |
| 0000 0011 000 | 16 | ial

INFORMATION PROCESSING APPARATUS, INFORMATION PROCESSING METHOD, DATA RECORDING MEDIUM, AND INFORMATION PROCESSING SYSTEM

BACKGROUND OF THE INVENTION

1. Field of the Invention

The present invention relates generally to an information processing apparatus, an information processing method, a data recording medium, and an information processing system. More particularly, the invention relates to an information processing apparatus, an information processing method, a data recording medium, and an information processing system, in which digital data can be protected from illegal copying.

2. Description of the Related Art

Because of recent widespread use of networks, typically, the Internet, various types of information can be transmitted and received via networks. Accordingly, different types of information can be easily accessed, but on the other hand, the danger of making illegal copies of electronic publications is seriously increasing.

In particular, the following problems are encountered through the use of known networks. Even if the users illegally make copies of information received by their own terminals via networks and distribute the copies, it is difficult to determine the source of such copying.

SUMMARY OF THE INVENTION

Accordingly, in view of the above background, it is an object of the present invention to provide an improvement in which illegal copying can be prevented.

In order to achieve the above-described object, according to one aspect of the present invention, there is provided an information processing unit comprising: input means for receiving a data input; output means for outputting the data input from the input means; and recording means for recording on the data identification information, which serves to distinguish the information processing unit from the other information processing units, when the data is input or output.

According to another aspect of the present invention, there is provided an information processing method in which data is input and output, and identification information concerning an information processing unit to distinguish the unit from the other information processing units is recorded on the data when the data is input or output.

According to still another aspect of the present invention, there is provided a data recording medium in which an identification number inherent in an information processing unit having recorded data is recorded with the data.

According to a further aspect of the present invention, there is provided an information processing system comprising a plurality of information processing units interconnected to each other via a network, wherein the information processing units each record identification information concerning the information processing unit to distinguish the unit from the other information processing units when the information processing units receives an input and outputs data via a network.

BRIEF DESCRIPTION OF THE DRAWINGS

FIG. 10, which is comprised of FIGS. 10A and 10B, illustrates coding of DC-component sizes of DCT coefficients;

FIG. 11 illustrates codes of DC-component differentials of DCT coefficients;

FIG. 12 illustrates identification information;

FIG. 20 illustrates the Motion_code; and

DESCRIPTION OF THE PREFERRED EMBODIMENTS

Figure 1:
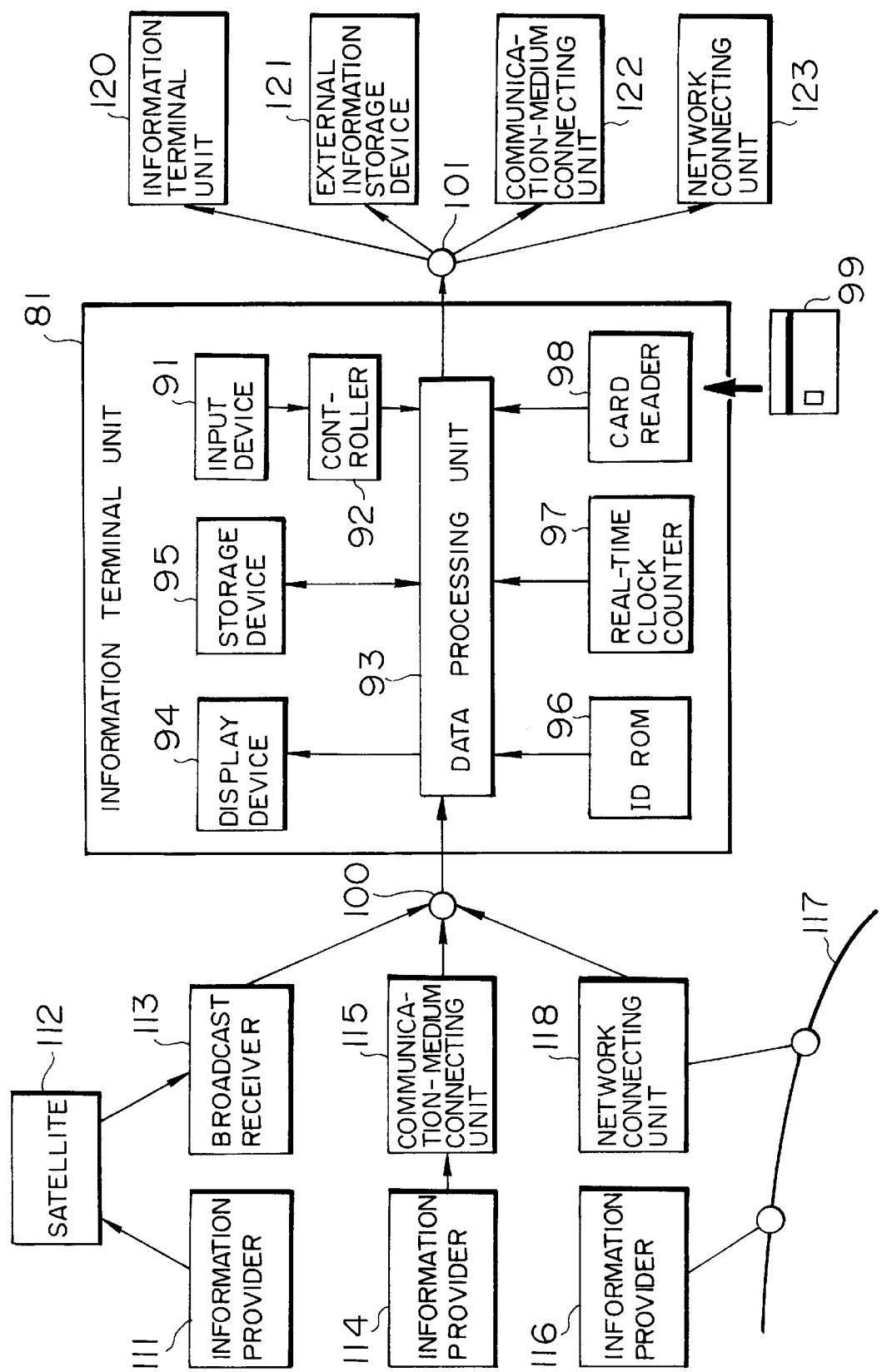
FIG. 1 is a block diagram of the configuration of an information terminal unit formed by the application of an information processing apparatus according to an embodiment of the present invention.

Referring to a schematic block diagram in FIG. 1, an explanation will now be given of an information terminal unit 81 formed by the application of an information processing apparatus of the present invention. In this terminal unit 81, signals transmitted from an information provider 111 via a satellite 112 and received by a broadcast receiver 113 are input to an input terminal 100. Also, information transmitted by another information provider 114 via a communication-medium connecting unit 115, such as a modem, is input to the input terminal 100. Further, information transmitted from an information provider 116 connected to a network 117, typically the Internet, and received via a network connecting unit 118, such as a modem, is sent to the input terminal 100.

A data processing unit 93 in the information terminal unit 81 stores data captured through the input terminal 100 in a built-in storage device 95 formed of a hard disk, a magnetic disk, a magneto-optical disk, or a solid memory. A display device 94 displays the information input through the input terminal 100 or the information stored in the storage device 95. An identification (ID) ROM 96 stores the ID number inherent in the terminal unit 81.

A real-time clock counter 97 invariably counts time and outputs time information. A card reader 98 reads an ID card 99 owned by the user or the operator of the terminal unit 81 and outputs the ID number stored in the ID card 99 to the data processing unit 93. A controller 92 controls the data processing unit 93 and the other devices in accordance with the instructions from an input device 91, such as a keyboard or a mouse.

The information terminal unit 81 is configured in the aforedescribed manner to output via an output terminal 101 the information captured through the input terminal 100 or the information read from the storage device 95 to another information terminal unit 120, an external information storage device 121, a communication-medium connecting unit 122, or a network connecting unit 123.

Figure 2:
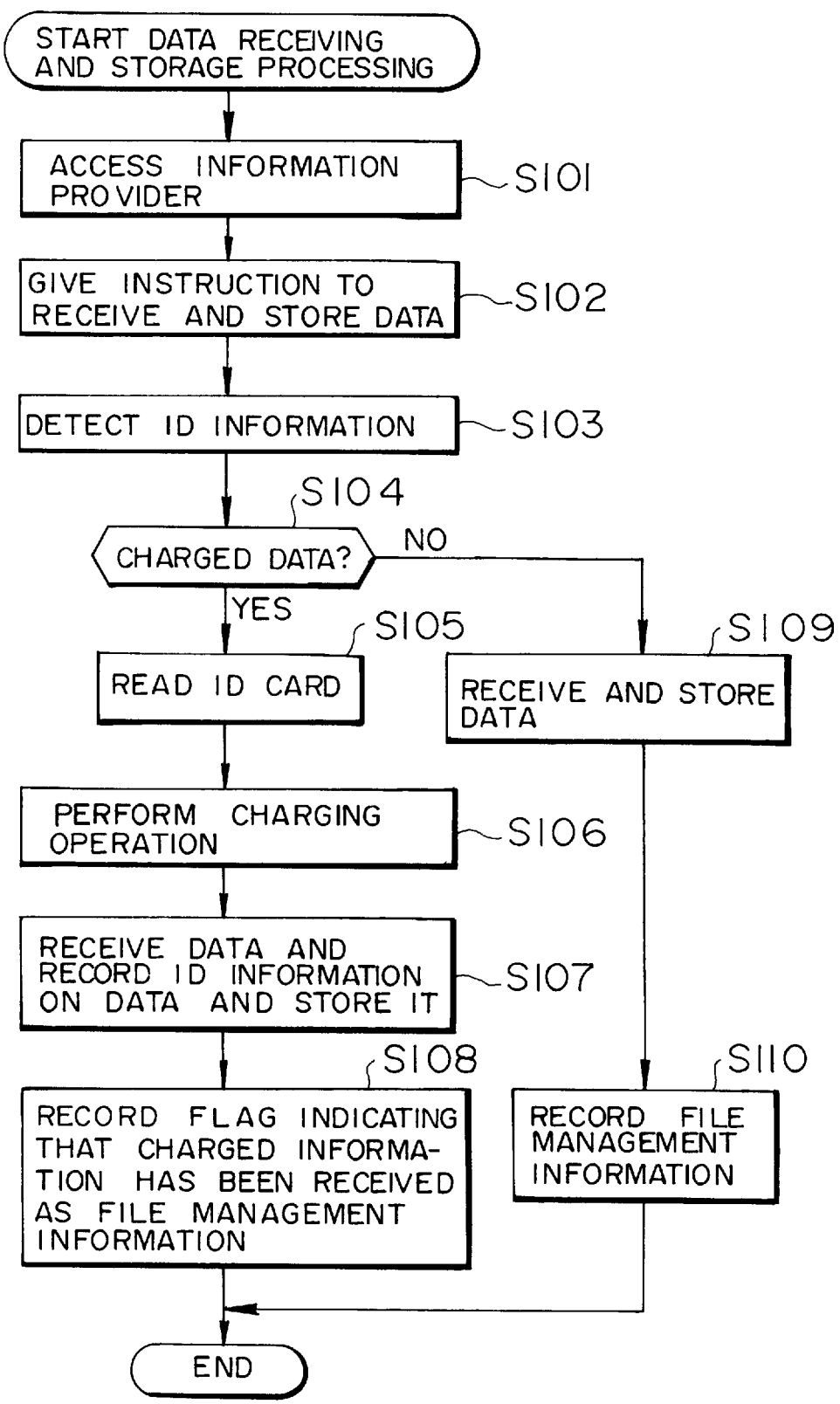
FIG. 2 is a flow chart illustrating the operation of the storage of receiving data performed by the embodiment shown in FIG. 1.

A description will now be given with reference to the flow chart in FIG. 2 of the processing operation in which the information terminal unit 81 shown in FIG. 1 incorporates predetermined information via the network 117 and stores it in the storage device 95.

In S101, the user operates the input device 91 to instruct the controller 92 to start accessing a predetermined information provider. In response to this instruction, the controller 92 controls the network connecting unit 118 to access the information provider specified by the input device 91 (in this embodiment, the provider 116). Then in S102, the user manipulates the input terminal 91 to give an instruction to store the information provided by the provider 116 via the network 117 in the storage device 95. It is then determined in S103 whether identification (ID) information has been recorded on the provided information stored in the storage device 95. This makes it possible to determine whether the information received by this terminal 81 has already been received by another information terminal unit and stored in the storage device 95. The ID information will be described in greater detail below.

The information provider 116 accessed by the terminal unit 81 outputs via the network 117 information indicating whether or not the user will be charged for the data to be provided. The controller 92 of the terminal unit 81 receives this information through the network connecting unit 118, the input terminal 100 and the data processing unit 93 and displays it on the display device 94. Thus, the user can be notified whether or not he/she will be charged.

The controller 92 makes a further determination in S104 according to the information received by the data processing unit 93 whether or not the user will be charged for the information to be provided. If the answer is yes, the flow proceeds to S105 in which the controller 92 controls the data processing unit 93 to cause the display device 94 to display a message, for example, "insert ID card." The user then inserts his/her ID card 99 into the card reader 98 according to this message and permits the reader 98 to read the ID card 99. The ID number of the user who possesses this card 99 has been registered on the card 99.

Then, In S105 the controller 92 reads the ID number on this card 99 and, at the same time, in S106 performs the charging operation. Namely, the controller 92 stores in the storage device 95 a history indicating that the charged information has been received from the information provider 116. The user's credit card number is also registered on the ID card 99 and is supplied together with the user's ID number to the provider 116 via the network 117. In the embodiment illustrated in FIG. 1, the information is output to the network 117 through the network connecting unit 123, which is substantially the same as the network connecting unit 118. The information provider 116 performs a settlement for the information charge by the credit card with the informed number.

Subsequently, in S107 the controller 92 controls the data processing unit 93 to store the information provided by the provider 116 in the storage device 95. Simultaneously, the controller 92 records the ID information on the provided information. A specific method for recording this ID information will be described in greater detail below.

The ID information includes the ID stored in the ID ROM 96. The ID inherent in the information terminal unit 81 includes the manufacturer, the unit (terminal) name, and the serial number of this terminal unit 81, which can be indicated, for example, as follows.

Manufacturer: SONY
Terminal unit: IVS-1000
Serial no.: 12345

The ID information also contains the current time counted by the real-time clock counter 97, i.e., the time at which the data is input, the time being represented by time, date, month and year, for example, as follows.

1995. 12. 01. 12:00

According to this time information, the time and date when this data is input into the terminal unit 81 can be specified.

The user's ID read by the ID card 99 is recorded in a multiplexing manner on the data to be stored in the storage device 95. This ID is an ID number indicated, for example, as follows.

The user ID: 81-3-5448-3365

Subsequently, the flow proceeds to S108 in which the controller 92 causes the storage device 95 to record a flag representing that charged information has been received, as file management information used for managing the stored information as a file (stored as a file separately from the stored information). This flag may be multiplexed with the data itself and recorded together rather than being separately stored as file management information.

If it is found in S104 that the data to be stored is free, the flow proceeds to S109 in which the controller 92 controls the data processing unit 93 to directly store the captured data in the storage device 95. In S110, the file management information of the stored information is stored in the storage device 95. Namely, the ID information is not multiplex-recorded on the provided data.

Figure 3:
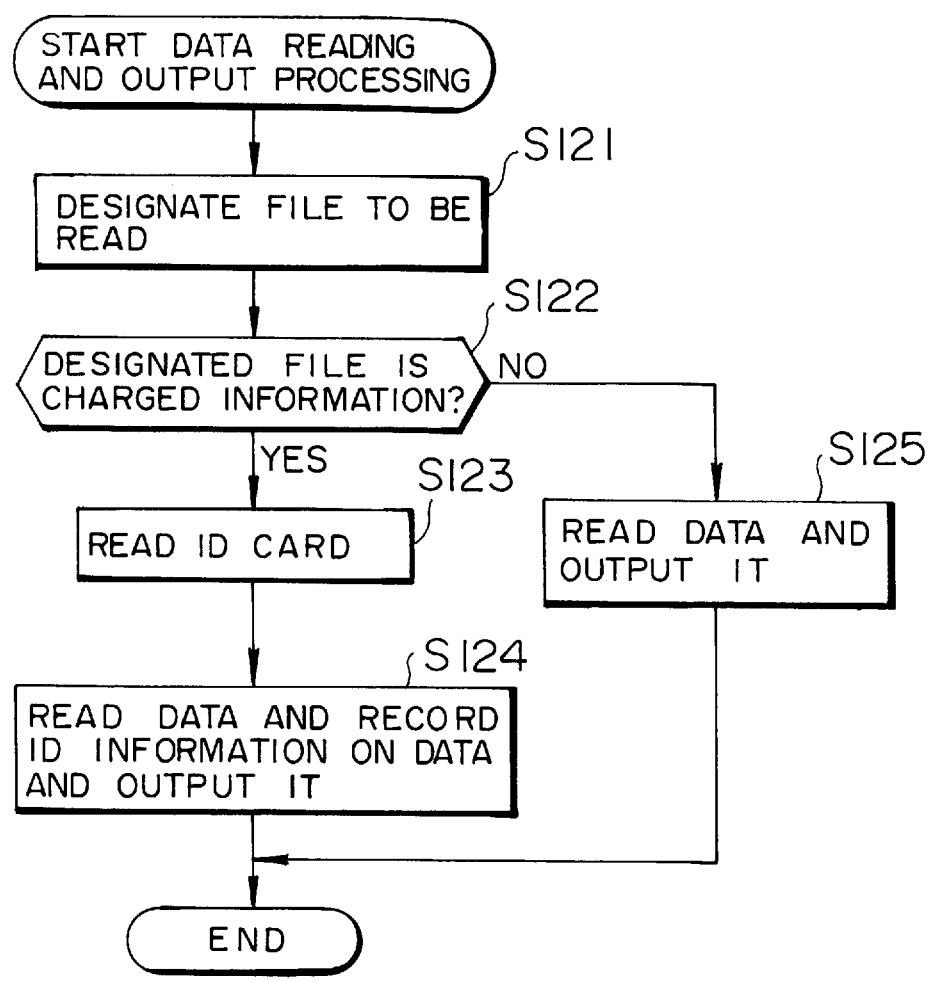
FIG. 3 is a flow chart illustrating the operation of reading the stored information performed by the embodiment shown in FIG. 1.

A description will now be given with reference to the flow chart in FIG. 3 of an embodiment in which the information stored in the storage device 95 in the above-described manner is transferred to another information terminal unit.

In S121, the user operates the input device 91 to instruct the controller 92 to read a predetermined file from the storage device 95. In response to this instruction, the controller 92 controls the storage device 95 through the data processing unit 93 to start the reading operation of the designated file. Then, the controller 92 determines in S122 as to whether the user will be charged for the designated file information, and more specifically, the controller 92 reads the file management information stored in the storage device 95 (the information recorded in S108 or S110 of FIG. 2) and, based on this information, judges whether or not the user will be charged for the information to be read.

If it is found in S122 that the user will be charged, the flow proceeds to S123 in which the controller 92 controls the data processing unit 93 to display onto the display device 94 a message, for example, "insert ID card". The user then inserts the ID card 99 into the card reader 98 according to this message, and the reader 98 reads the information recorded on this card 99.

Subsequently, in S124 the controller 92 reads the file stored in the storage device 95 and outputs it to another information terminal unit 120 via the output terminal 101. At this time, the data processing unit 93 records the ID information on the data to be output to the output terminal 101 from the storage device 95. More specifically, the ID stored in the ID ROM 96, the time information output from the real-time clock counter 97 when the data was output, and the ID read by the card reader 98 are multiplex-recorded on the data and then output. Accordingly, the data output from the information terminal unit 81 includes not only the ID information at the time when the data was input to the terminal unit 81, but also the ID information concerning the time when the data was output from the unit 81.

If it is determined in S122 that the user will not be charged for the specified file information, i.e., the information is free, the flow proceeds to S125 in which the controller 92 reads the specified file from the storage device 95 and outputs it through the output terminal 101. Namely, the ID information is not recorded on the provided data.

If an instruction is given through manipulation of the input device 91 to read the information stored in the storage device 95 and display it on the display device 94, the controller 92 reads the designated file from the storage device 95 and displays it on the display device 94. That is, the ID information is not recorded.

According to the above description, the information provided by the information provider 116 via the network 117 is stored in the storage device 95 while the ID information is recorded on the provided data. Similarly, the ID information is also recorded if the information is provided by another user by means such as, what is referred to as, "personal computer communications", i.e., the information is given by the information provider 114 through the communication-medium connecting unit 115. The same applies to the program information broadcast by the information provider 111, typically, a broadcast station, via the satellite 112 and received by the broadcast receiver 113. The same also applies to stored data read from the external information storage unit 121.

Further, the aforedescribed embodiment has been explained in which the stored data together with the ID information is transmitted to the information terminal unit 120. However, the ID information is recorded on the data to be stored in the external information storage unit 121, such as a hard disk, a magneto-optical disk, or a detachable floppy disk. The same applies to the data to be transmitted to another user by means of personal computer communications via the communication-medium connecting unit 122 and also to the data to be transmitted to the network 117 via the network connecting unit 123.

Even though the information terminal unit 81 simply sends information to the output terminal 101 from the input terminal 100 without storing it in the storage device 95 (i.e., merely relaying), it records the ID information when the provided data is input and output.

The terminal unit 81 may be modified to record either the ID information when the provided data is input from the input terminal 100, or the ID information when the data is output from the output terminal 101.

Figure 4:
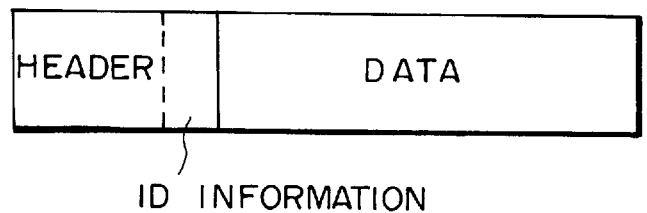
FIG. 4 illustrates a method for recording identification information.

ID-information recording (multiplex-recording) methods will now be explained. FIG. 4 illustrates a first method for recording ID information on data. In this method, the data is formed into a packet and then transmitted and stored. Each packet contains a header representing information on the following data, and ID information is added as part of the header.

Figure 5:
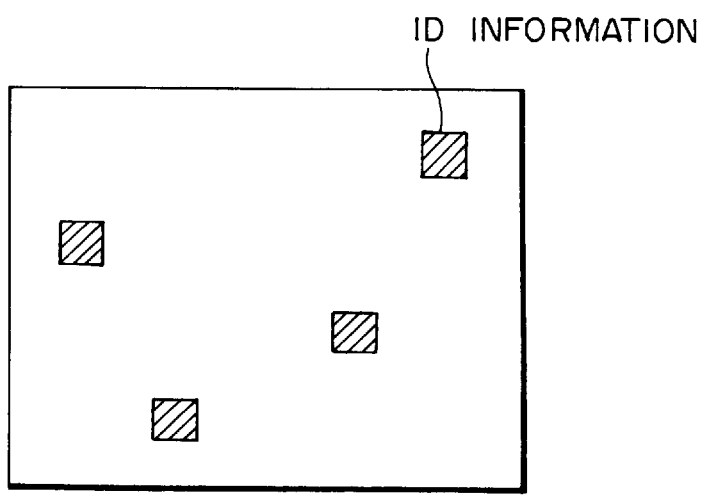
FIG. 5 illustrates another method for recording identification information.

FIG. 5 illustrates a second ID-information recording method. In this method, data is expressed in the form of image data with at least one item of the data being stored as ID information. This method, however, makes it more difficult to separate ID information from data than the first method because the ID information is embedded into part of the data.

Figure 6:
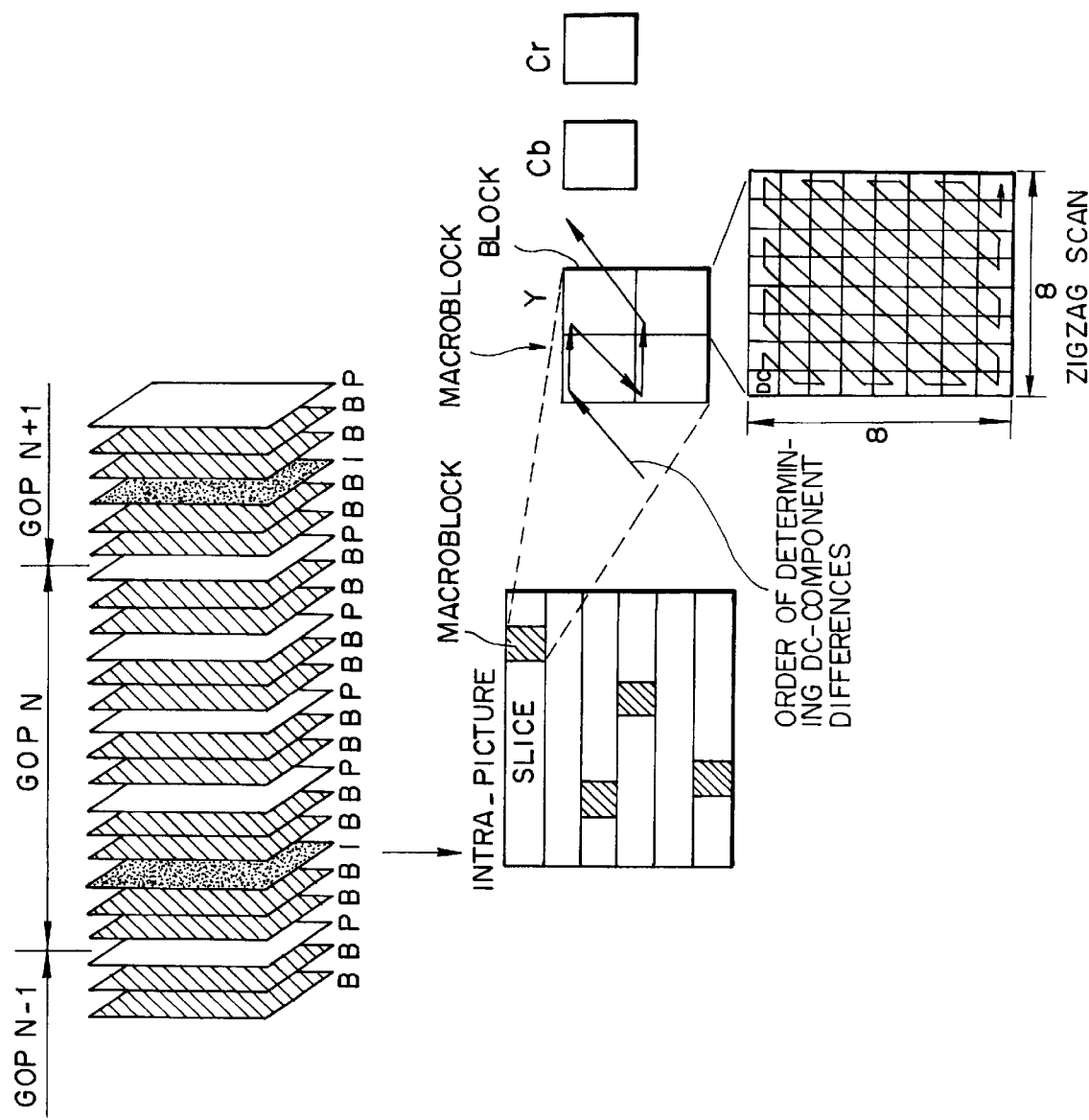
FIG. 6 illustrates the principle of recording identification information.

FIG. 6 illustrates the principle of ID-information recording according to the second method shown in FIG. 5. FIG. 6 shows that a Group of Pictures (GOP) is formed of one picture I, a plurality of pictures P and a plurality of pictures B, i.e., 15 pictures forming one GOP. In the embodiment illustrated in FIG. 6, picture I is selected from the GOP to record ID information therein.

Picture I, as well as the other pictures, is comprised of a plurality of slices, and each slice is formed of a predetermined number of macroblocks. A predetermined macroblock has been selected. A 16×16-pixel macroblock is constructed of four 8×8-pixel luminance signal (Y) blocks, one 8×8-pixel color difference signal (Cb) block and one 8×8-pixel color difference signal (Cr) block. The data in each block is subjected to the Discrete Cosine Transform (DCT) so as to be transformed into DCT coefficients, which are orthogonal transformation coefficients. Then, the 8×8 DCT coefficients Coeff [0] [0] through Coeff [7] [7] of each block are quantized in a predetermined quantizing step so as to be transformed into quantized levels QF [0] [0] through QF [7] [7]. Among the DCT coefficients, Coeff [0] [0] (scan [0]) positioned in the uppermost left of the 8×8 matrix represents a direct current (DC) component, which can be determined by coding a difference between the DC component of this block and the DC component of the precious block, which is regarded as an estimated value. The remaining components, which are alternating current (AC) components, are rearranged into scan [1] through scan [63] by zigzag scanning in the block, subsequent to the DC component scan [0]. The rearranged scan [1] through scan [63] are then coded.

In this embodiment constructed as described above, two blocks are selected for recording ID information. A first block is used for setting (writing) a bit level of ID information to be recorded, while a second block is employed for writing correction data to compensate for mismatches produced because the bit level has been set in the first block.

Figure 7:
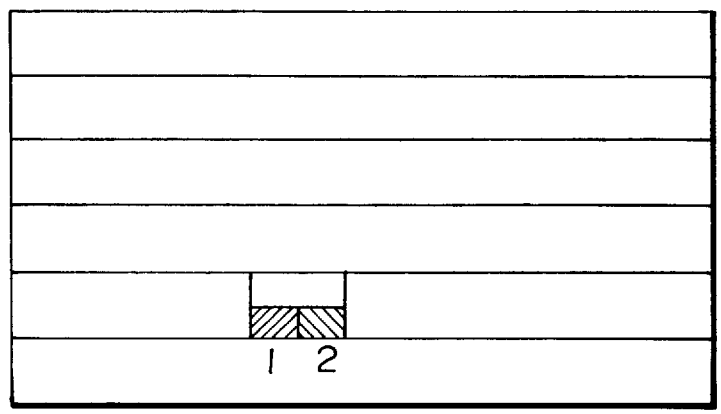
FIG. 7 illustrates an example of selecting first and second blocks.
Figure 8:
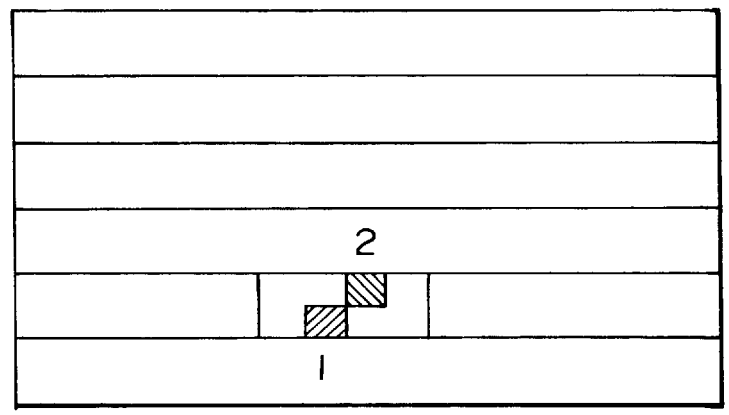
FIG. 8 illustrates another example of selecting first and second blocks.

The first block and the second block may be selected from the same macroblock, as illustrated in FIG. 7. Alternatively, the first and second blocks may be chosen from different macroblocks, as shown in FIG. 8. It should be noted that the first and second blocks be selected in the chronological order of computations of the differences in DC components of the respective blocks. In FIGS. 7 and 8, numbers 1 and 2 designate the first and second blocks, respectively.

Figure 9:
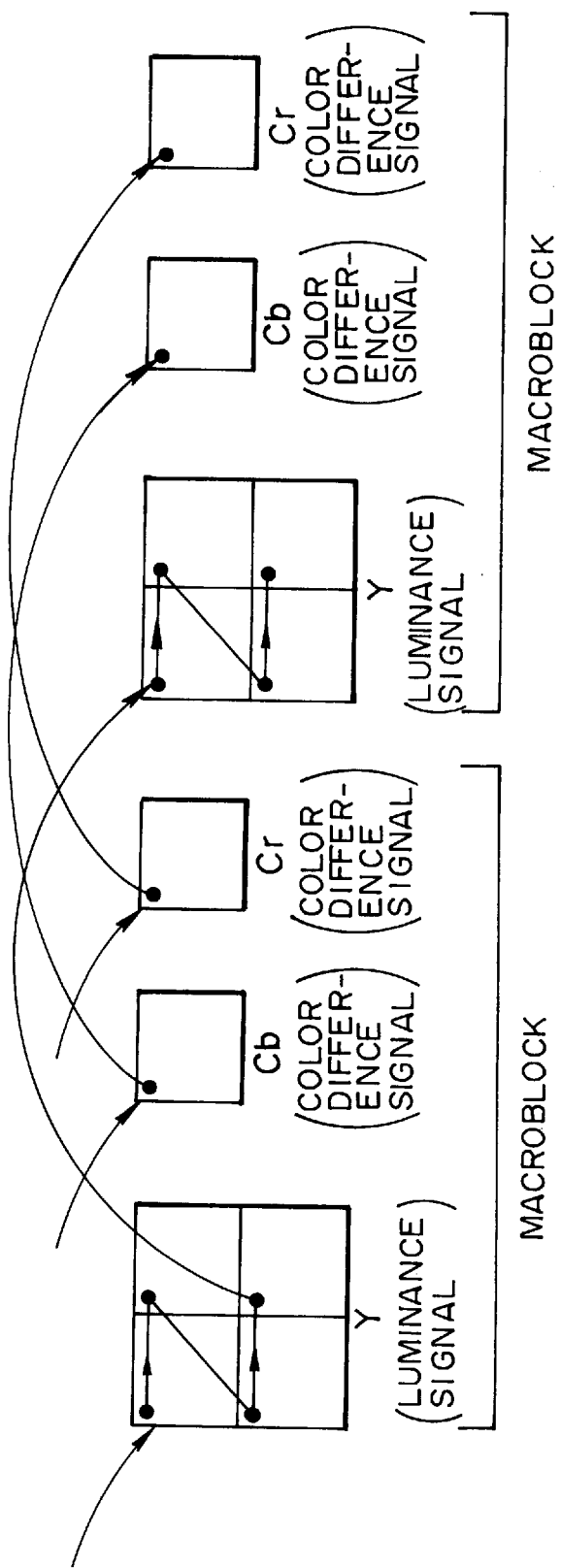
FIG. 9 illustrates coding of discrete cosine (DC) components of discrete cosine transform (DCT) coefficients.

More specifically, as noted above, the DC component of the DCT coefficients in each block is found by coding the difference between the DC component of a current block and the DC component of a previous block. For a luminance signal, as illustrated in FIG. 9, the above-described difference computation and coding operation is executed on the four blocks in the order of upper left, upper right, lower left, and lower right. More specifically, the DC component of the upper left block is determined by coding the difference between the DC component of this block and the DC component of the lower-right block of a previous macroblock. The DC component of the upper right block is found by coding the difference between the DC component of this block and the DC component of the upper left block; the DC component of the lower left block is determined by coding the difference between the DC component of this block and the DC component of the upper right block; and the DC component of the lower right block is found by coding the difference between the DC component of this block and the DC component of the lower left block. For the color difference signals, differences between the DC components of the respective color difference signal Cb and Cr blocks and the corresponding previous blocks are determined and coded.

Coding for each DC component difference is represented by the size and the actual values (DC Differentials) which are representable by the size. The size is indicated by Variable Length Code (VLC), while the DC differentials are designated by Fixed length Code (FLC).

The size of the DC component of the luminance signal is specified, for example, as illustrated in FIG. 10A, while the size of the color difference signals is designated, for example, as shown in FIG. 10B. Further, if the size of the DC component is, for example, equal to 3, the DC Differentials are designated as illustrated in FIG. 11. Accordingly, for a luminance signal, if for example, the DC component size is "3", and its actual value is "−6", the VLC for size 3 is "101", and the DC Differential for −6 is "001". The difference is thus represented by "101001".

In this embodiment, the ID information can be recorded by substituting the least significant bit (LSB) of the DC Differential of the first block with the bit level of the ID information to be recorded. For example, if the bit level of the ID information to be recorded is "0" and the DC Differential of the first block is "101", the LSB of the DC Differential is changed to "0", and the resulting DC Differential is thus rewritten by "100". In contrast, if the bit level of the ID information to be recorded is "1" and the DC Differential of the first block is "010", the LSB of the DC differential is substituted with "1", so that the resulting DC Differential can be rewritten by "011".

As a consequence, rewriting of the DC Differentials of the first block is performed as indicated by the arrows in FIG. 11. For example, if the DC Differential is "001", and its LSB is rewritten by "0", the resulting DC Differential is changed to "000" rather than "001". Also, the DC Differential "010" is rewritten by "011", and conversely, "011" is changed to "010". Namely, only LSBs are overwritten.

If the LSB of the DC Differential of the first block was originally the same as the bit level of the ID information to be recorded, it implies that the ID information has already been substantially recorded, and thus, no change is made to the LSB.

Upon rewriting of the LSB of the DC Differentials (the levels in the left column of FIG. 11) of the first block in the above-described manner, the actual values of the DCT coefficients (the values in the right column of FIG. 11) are incremented or decremented by "1". Thus, the DC Differentials of the second block are corrected to compensate for an increment or a decrement in the actual values of the DCT coefficients of the first block.

More specifically, if the LSB of the DC Differential of the first block is changed from "0" to "1", the actual value of the DCT coefficient is incremented by "1". The DC Differential of the second block is accordingly rewritten so that the actual value of the DCT coefficient can be decremented by "1". Conversely, if the LSB of the DC Differential of the first block is rewritten from "1" to "0", the actual value of the DCT coefficient is decremented by "1". The DC Differential of the second block is thus changed so that the actual value of the DCT coefficient can be incremented by "1".

For example, if the DC Differential of the first block is overwritten from "010" to "011", the actual value of the DCT coefficient is incremented by "1" from "−5" to "−4". Accordingly, the DC Differential, for example, "110", of the second block is changed to "101" so that the actual value of the DCT coefficient can be decremented by "1" from "6" to "5". Similarly, if for example, the DC Differential of the first block is overwritten from "011" to "010", the actual value of the DCT coefficient is decremented by "1" from "−4" to "−5". Consequently, the DC Differential, for example, "110", of the second block is changed to "111", thereby incrementing the actual value of the DCT coefficient by "1" from "6" to "7".

In this manner, one bit of ID information is written into one block. Accordingly, if ID information has n bits, as shown in FIG. 12, the LSBs of the DC Differentials of a maximum of n blocks are rewritten.

Figure 13:
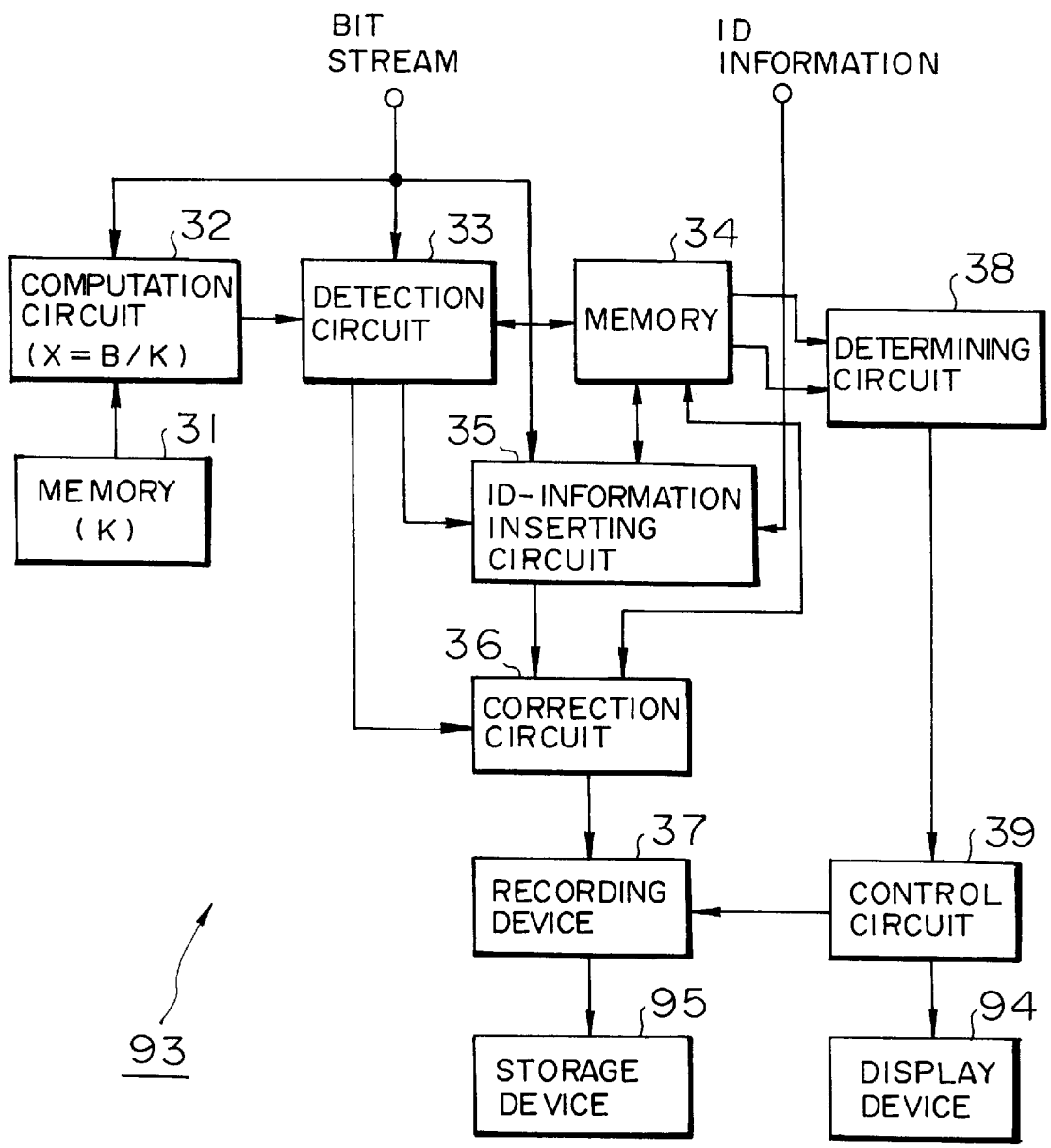
FIG. 13 is a block diagram illustrating an embodiment of the configuration of the data processing unit shown in FIG. 1.

An explanation will now be given with reference to FIG. 13 of an example of the configuration of the data processing unit 93 when ID information is recorded based on the aforedescribed principle.

In this embodiment, a computation unit 32 computes a predetermined key K stored in a memory 31 and part of data B included in an input bit stream, and upon this computation, determines the above-noted first black. A detection circuit 33 detects the DC Differential from the block designated by the output of the computation unit 32. Then, the circuit 33 supplies the LSB of the DC Differential of the first block and the DC Differential of the second block to a memory 34 and stores them therein. An ID-information inserting circuit 35 stores in the memory 34 the bit level of the ID information to be recorded. Further, upon receiving an input of a first-block detection signal from the detection circuit 33, the inserting circuit 35 overwrites the LSB of the DC Differential of the first block contained in the bit stream by the bit level of the ID information supplied from the memory 34.

Upon receiving an input of a second-block detection signal from the detection circuit 33, a correction circuit 36 writes correction data in the second block contained in the bit stream (ID information has been written into the first block of the bit stream) supplied from the inserting circuit 35. The data output from the correction circuit 36 is fed to a recording device 37 which then stores the data in a storage device 95.

Figure 14:
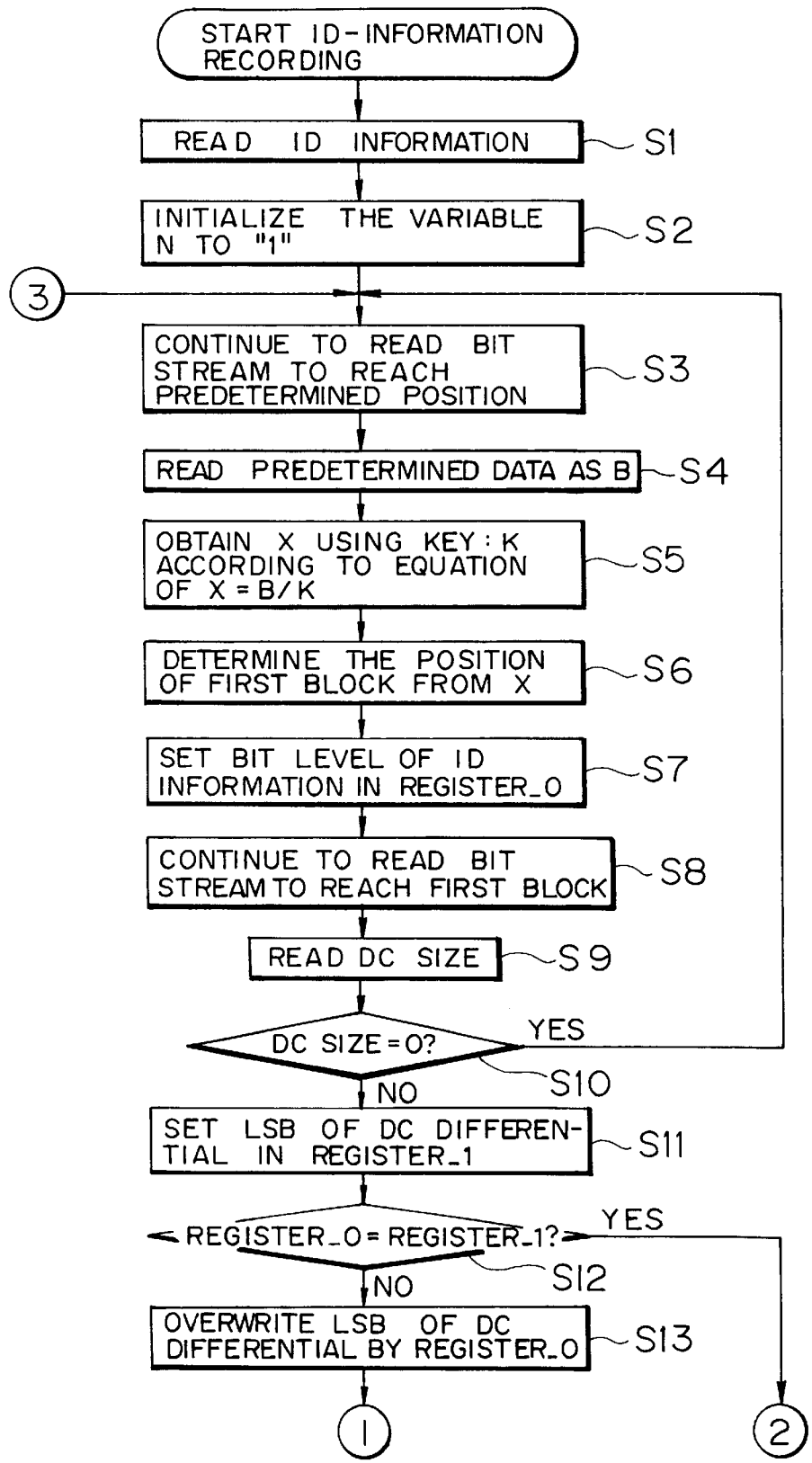
FIG. 14 is a flow chart illustrating the recording operation performed by the embodiment shown in FIG. 13.
Figure 15:
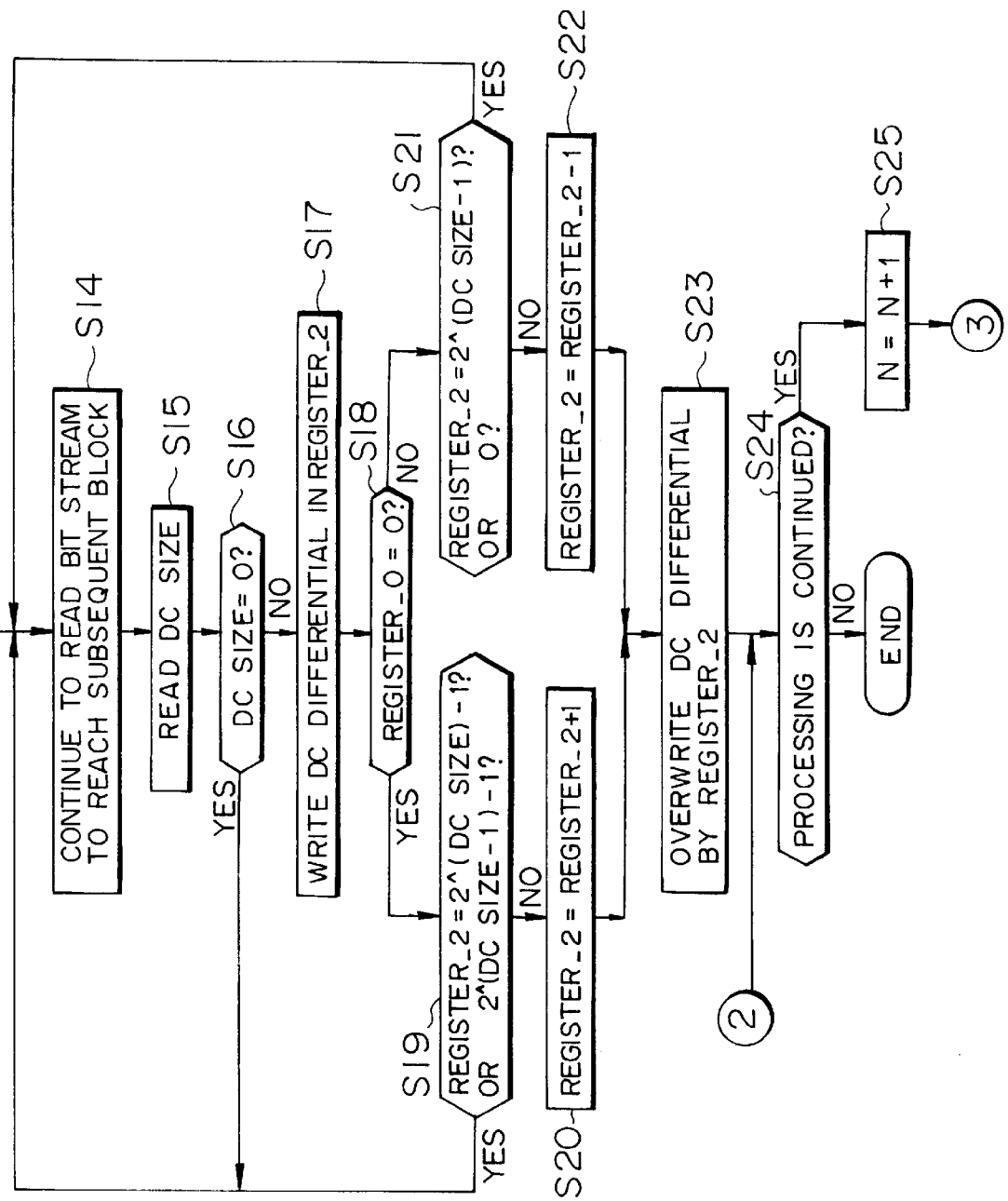
FIG. 15 is a flow chart continued from the flow chart shown in FIG. 14.

The operation of recording ID information on a bit stream will now be described while referring to the flow charts of FIGS. 14 and 15. This recording operation can be performed after input data is temporarily stored in a buffer (not shown).

In S1, the ID-information inserting circuit 35 reads ID information from the ID ROM 96 or the ID card 99 and stores the read information in the memory 34. Then, in S2 the inserting circuit 35 initializes the variable N to "1". The variable N represents the bit position of n bits into which the data is about to be written. The computation circuit 32 reads the input bit stream to reach a predetermined bit position in S3. Then, the circuit 32 reads predetermined data from the bit stream of the picture I located within a GOP and determines the read data as B in S4. The flow further proceeds to S5 in which the computation circuit 32 obtains X according to the following equation using the key (K) stored in the memory 31:

X=B/K

In S6, the computation circuit 32 determines the position of the first block according to the value X calculated in S5. For example, the four bits adjacent to the most significant bit (MSB) or the four bits close to the least significant bit (LSB) may be determined as the first block. Alternatively, a macroblock may be specified by the six bits adjacent to the MSB and a block within the macroblock may be designated as the first block by the two bits close to the LSB.

Then, in S7 the ID-information inserting circuit 35 reads, based on the variable N, the bit level of the ID information to be written into the bit stream from the ID information stored in the memory in S1, and sets (stores) the read bit level in the Register_0 of the memory 34. For the n-bit ID information, for example, as shown in FIG. 12, if the variable N is "1", the MSB "1" of the information illustrated in FIG. 12 is set in the Register_0. A bit string of ID information may be recorded starting either from the MSB or the LSB. Alternatively, information may be recorded in a predetermined order, i.e., from a bit other than the MSB and the LSB.

Thereafter, in S8 the detection circuit 33 reads the bit stream until it reaches the first block, and in S9 reads the DC Size of the first block. It is then determined in S10 whether the DC Size is "0". If the answer is yes, the presence of the DC Differential is denied, thereby making it impossible to write the bit level of the ID information in the first block. The flow then returns to S3. If it is found in S10 that the DC Size is not "0", the flow proceeds to S11 in which the detection circuit 31 outputs the LSB of the DC Differential of the first block to the memory 34 and sets the LSB in the Register_1 of the memory 34.

Then, the flow proceeds to S12 in which it is judged whether the level stored in the Register_1 of the memory 34 and that in the Register_0 of the memory 34 (i.e., the LSB of the DC Differential of the first block and the bit level of the ID information to be recorded) are equal to each other. If the answer is yes, the ID information has already been substantially recorded. Thus, there is no need to change the data, and the flow proceeds to S24.

In contrast, if it is found by the detection circuit 33 in S12 that the level of the Register_1 differs from that of the Register_0, the flow proceeds to S13 in which the LSB of the DC Differential of the first block is overwritten by the level of the Register_0 (i.e., the bit level of the ID information to be recorded) by the ID-information inserting circuit 35. Namely, the LSB of the DC Differential of the first block is determined at the same bit level as the ID information.

According to the aforedescribed processing, one bit of ID information has been recorded. Such an ID-information recording operation causes a deviation in a decoded resulting image from the original bit stream: for example, if the DC level of one block is quantized with 8 bits, the resulting data deviates from the original image by one; a DC level quantized with 9 bits causes a deviation of the resulting image by 0.5; a DC level quantized with 10 bits incurs a deviation of the image by 0.25; and a DC level quantized with 11 bits brings about a deviation by 0.125.

Thus, a correcting operation is required to compensate for such mismatches produced by the recording of ID information. More specifically, the detection circuit 33 continues to read the bit stream until it reaches the subsequent block (the second block) in S14, and reads the DC Size of the second block in S15.

Figure 16:
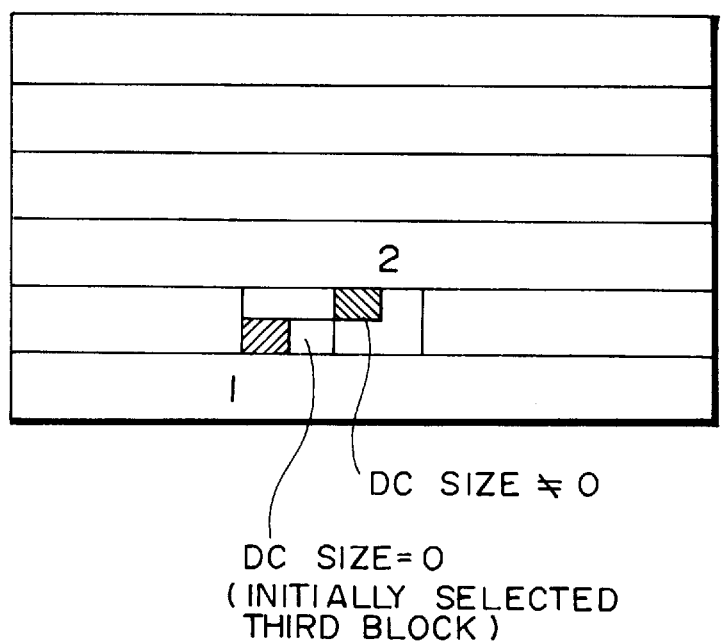
FIG. 16 illustrates the processing in S16 shown in FIG. 15.

It is determined by the detection circuit 33 in S16 as to whether the DC Size of the second block is "0". If the answer is yes, there are no DC Differentials, which means that it is impossible to perform a correcting operation. Accordingly, the flow returns to S14 in which the detection circuit 33 continues to read the bit stream until it reaches the subsequent block used as the second block. In S15 the circuit 33 then reads the DC Size of the second block. Namely, as illustrated in FIG. 16, if the DC Size of the block designated as the second block is "0", a subsequent block with DC Size other than "0" is further selected as the second block.

If it is determined in S16 that the DC Size of the second block is not "0", the flow proceeds to S17 in which the detection circuit 33 reads the DC Differential of the second block and writes it in the Register_2 of the memory 34. As a result, the levels of the three bits "000" through "111" indicated in the left column of FIG. 11, for example, are stored in the Register_2.

Thereafter, a query is made in S18 by the detection circuit 33 whether the level stored in the Register_0 of the memory 34 is "0". If the answer is yes, the flow proceeds to S19 in which it is judged as to whether the levels of the DC Differentials of the second block which have been stored in the Register_2 in S17 equal 2^(DC Size)-1 or 2^(DC Size-1)-1. It should be noted that "^" means squared.

More specifically, since it is found in S18 that the level of the Register_0 is "0", the LSB of the DC Differential of the first block has been rewritten from "1" to "0" (the actual value (differential) of the DCT coefficient has been decremented by "1") in S13. In order to offset this decrement, the LSB of the DC Differential of the second block is incremented by "1" (basically, as shown in FIG. 11, the differential (actual value) of the DCT coefficient is incremented by "1" as the DC Differential is incremented by "1"). This incrementing operation will be performed in S20. However, if the DC differential of the second block is, for example, "111" (when DC Size is 3, $2^3-1=7$"111", i.e., the differential of the DCT coefficient is 7), which is the maximum level, the differential cannot be incremented greater than this level. It is thus validated that this block is not suitable for performing the correcting operation.

Likewise, if the level of the Register_2 (the DC Differential of the second block) is equal to 2^(DC Size-1)-1, i.e., if the level of the Register_3 is $2^{(3-1)}-1=3(=$"011"$)$, the differential is "−4". Incrementing "−4" by "1" gives "−3", which is not specified in the DC Differential coding table shown in FIG. 11, and thus, this incrementing operation is impractical. That is, this block is inappropriate for the correcting operation.

In this fashion, if it is determined by the detection circuit 33 in S19 that the designated block is not suitable for a correcting operation, the flow returns to S14 in which the detection circuit 33 selects the subsequent block as the second block. In contrast, if it is found in S19 that the second block is appropriate to be corrected, the flow proceeds to S20 in which the detection circuit 33 increments the level of the Register_2 by "1". Subsequently, in S23 the correcting circuit 36 overwrites the DC Differential of the second block by the level stored in the Register_2.

If it is judged in S18 that the level of the Register_0 is not "0" (i.e., the Register_0 is "1"), the flow proceeds to S21 in which the detection circuit 33 determines whether the level of the Register_2 is equal to 2^(DC Size-1) or "0". More specifically, since it is found in S18 that the level of the Register_0 is "1", the LSB of the DC Differential of the first block has been rewritten from "0" to "1" (the differential of the DCT coefficient is incremented by "1"). In order to compensate for this increment, the DC Differential of the second block should be decremented by "1" in S22. If, however, the level of the DC Differential is "4" (=$2^{(3-1)}$=$2^2$=4="100"), the differential is specified as "4" in the DC differential coding table shown in FIG. 11. Decrementing "4" by "1" brings about "3", which is not designated in the above-mentioned table. Likewise, if the DC Differential is "000", the differential is specified as "–7". Decrementing "–7" by "1" results in "8", which is not designated in the above coding table. Accordingly, the blocks having the above levels of DC Differentials selected as the second block are not suitable to be corrected. The flow then returns to S14 in which the detection circuit 33 selects a subsequent block as the second block.

If it is determined in S21 that the designated second block can be suitably corrected, the flow proceeds to S22 in which the detection circuit 33 decrements the level of the Register_2 by "1". Thereafter, in S23 the correcting circuit 36 overwrites the DC Differential of the second block by the level of the second Register_2.

The flow further proceeds to S24 in which the control circuit 39 judges whether the ID-information recording operation will be continued, i.e., whether all of the bits of the ID information have been recorded. In this embodiment, it is determined whether the variable N equals the bit length n of the ID information. If the answer of S24 is no, the flow proceeds to S25 in which the variable is incremented by "1". Thereafter, the flow returns to S3, and the processings of S3 and the following steps are repeated. The aforedescribed processing is repeated a plurality of times, so that the whole n-bit ID information as illustrated in FIG. 12 can be recorded.

The overwriting operation in S13 is performed by the ID-information inserting circuit 35. More specifically, upon receiving an input of a first-block detection signal from the detection circuit 33, the inserting circuit 35 overwrites the LSB of the DC Differential of the input bit stream by the level stored in the Register_0 of the memory 34.

Further, the correcting operation in S23 is performed by the correcting circuit 36. More specifically, upon receiving an input of a second-block detection signal from the detection circuit 33, the correcting circuit 36 overwrites the DC Differential of the bit stream input via the ID-information inserting circuit 35 by the level stored in the Register_2 of the memory 34.

The writing of correction data is not essential and may be omitted, in which case, a slight level of noise is produced in a resulting image. In practice, however, this level of noise is almost inaudible to the viewer because only the LSB of the data is rewritten. Additionally, the differential pulse code modulation (DPCM) of the DC components is executed with a unit of slice, thereby restricting an adverse influence produced by the DPCM to the corresponding slice containing the block subjected to the DPCM.

According to the above description, the bit stream which has been provided with the ID information by the ID-information inserting circuit 35 and which has been also corrected by the correcting circuit 36 is supplied to the recording device 37 and recorded in the storage device 95.

Figure 17:
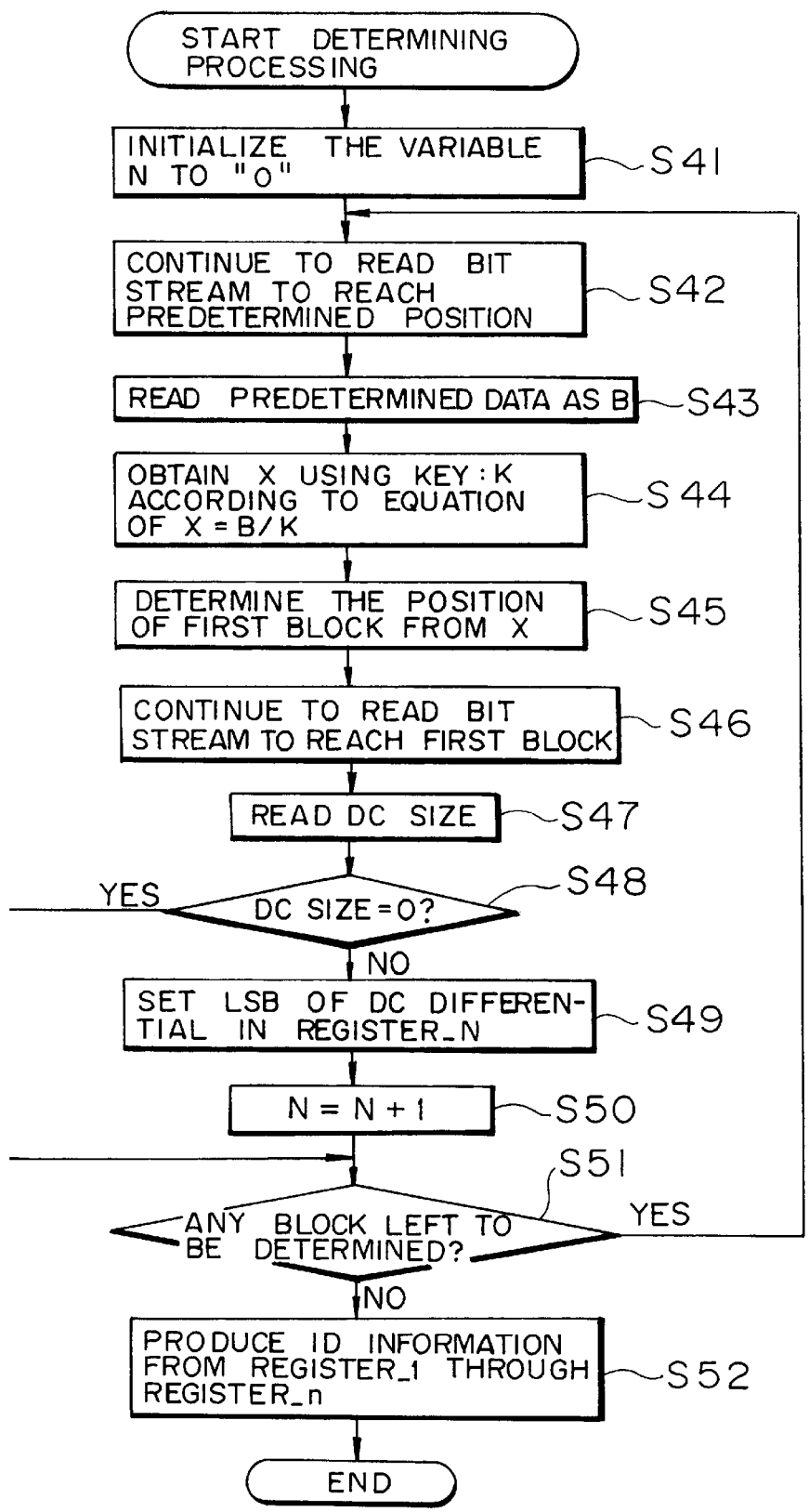
FIG. 17 is a flow chart illustrating the determining operation performed by the embodiment shown in FIG. 13.

The determining operation for detecting ID information will now be explained with reference to the flow chart of FIG. 17.

In S41 the control circuit 39 initializes the variable N to "0". The processings executed in the following S42 through S45 are similar to those in S3 through S6 in FIG. 14. More specifically, in S42 the computation circuit 32 continues to read the bit stream to reach a predetermined position, and in S43 further reads the bit stream as predetermined data B. Then, in S44 the circuit 32 divides the read data B by the key K stored in the memory 31 and, in S45, based on the quotient X, determines the position of the first block.

Subsequently, the flow proceeds to S46 in which the detection circuit 33 continues to read the bit stream to reach the first block, and in S47 reads the DC Size of the first block. A query is then made by the detection circuit 33 in S48 whether the DC Size of the first block read in S47 is "0". If the answer is no, the flow proceeds to S49 in which the detection circuit 33 sets the LSB of the DC Differential in the Register_N. The Register_N varies depending on the variable N.

Thereafter, in S50 the control circuit 39 increments the variable N by "1", and further checks in S51 whether there is any block left to be determined. If the answer is yes, the corresponding processings in S42 and the subsequent steps are executed. Namely, the flow returns to S42 in which the above-described processing is repeated because only the first bit of the ID information has been determined. Similarly, the determining operation can be performed to detect the whole n-bit ID information. In S52, the LSBs of the DC Differentials set in the respective Register_1 through Register_n in S49 are rearranged in the writing chronological order, thereby obtaining the n-bit ID information.

If it is found in S48 that the DC Size is "0", it can be assumed that ID information is not recorded on the first block. Thus, the processings in S49 and S50 are skipped. The differential pulse code modulation (DPCM) of the DC components is performed with a unit of slice. Accordingly, if the position of the first block is designated at the end of a slice, a deviation in the DC components produced by the DPCM does not adversely affect the subsequent blocks. In this case, it is not necessary to perform a correcting operation by the use of a second block.

In the above embodiment, the method for recording ID information only once has been explained. In this method, it is possible to determine by embedding the information indicating whether ID information is recorded on data, or specific initial ID information, into a predetermined first block whether a bit string read from a bit stream is ID information or mere image information. Alternatively, as will be described below, n-bit ID information is repeatedly recorded on a bit stream a plurality of times (for example, r times), thereby making it possible to substantially reliably determine that ID information is embedded into a bit stream. If, for example, n-bit ID information is embedded into a bit stream r times, it can be judged that a bit string read from the bit stream contains ID information with the probability of $(1-(1/2^{nr}))$. This processing method will now be explained.

Figure 18:
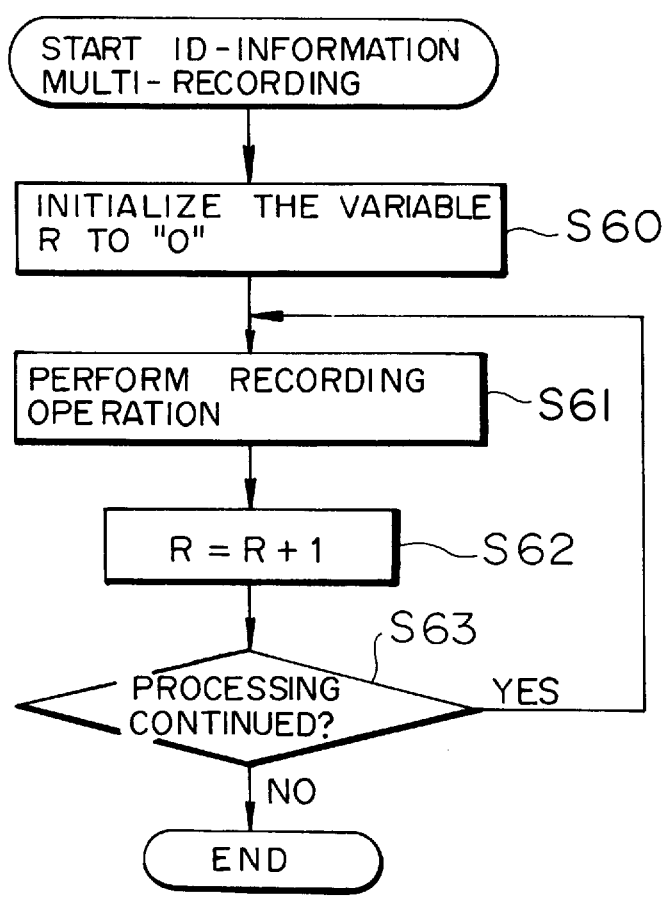
FIG. 18 illustrates the processing of recording identification information a plurality of times executed by the embodiment shown in FIG. 13.

A multi-recording method will first be described while referring to FIG. 18. In S60, the ID-information inserting circuit 35 initializes the variable R to "0". The variable R indicates the number of times for writing n-bit ID information on a bit stream. Then, in S61 the recording operation of embedding the n-bit ID information into the bit stream, which has been explained as referring to the flow charts of FIGS. 14 and 15, is performed. Thereafter, in S62 the ID-information inserting circuit 35 increments the variable R by "1", and in S63 it is determined whether the n-bit ID information has been embedded into the bit stream a predetermined number of times. If the answer in S63 is no, the flow returns to S61 in which the recording operation is again performed. If it is judged in S63 that the processing is about to be completed, the ID-information recording operation is ended.

Figure 19:
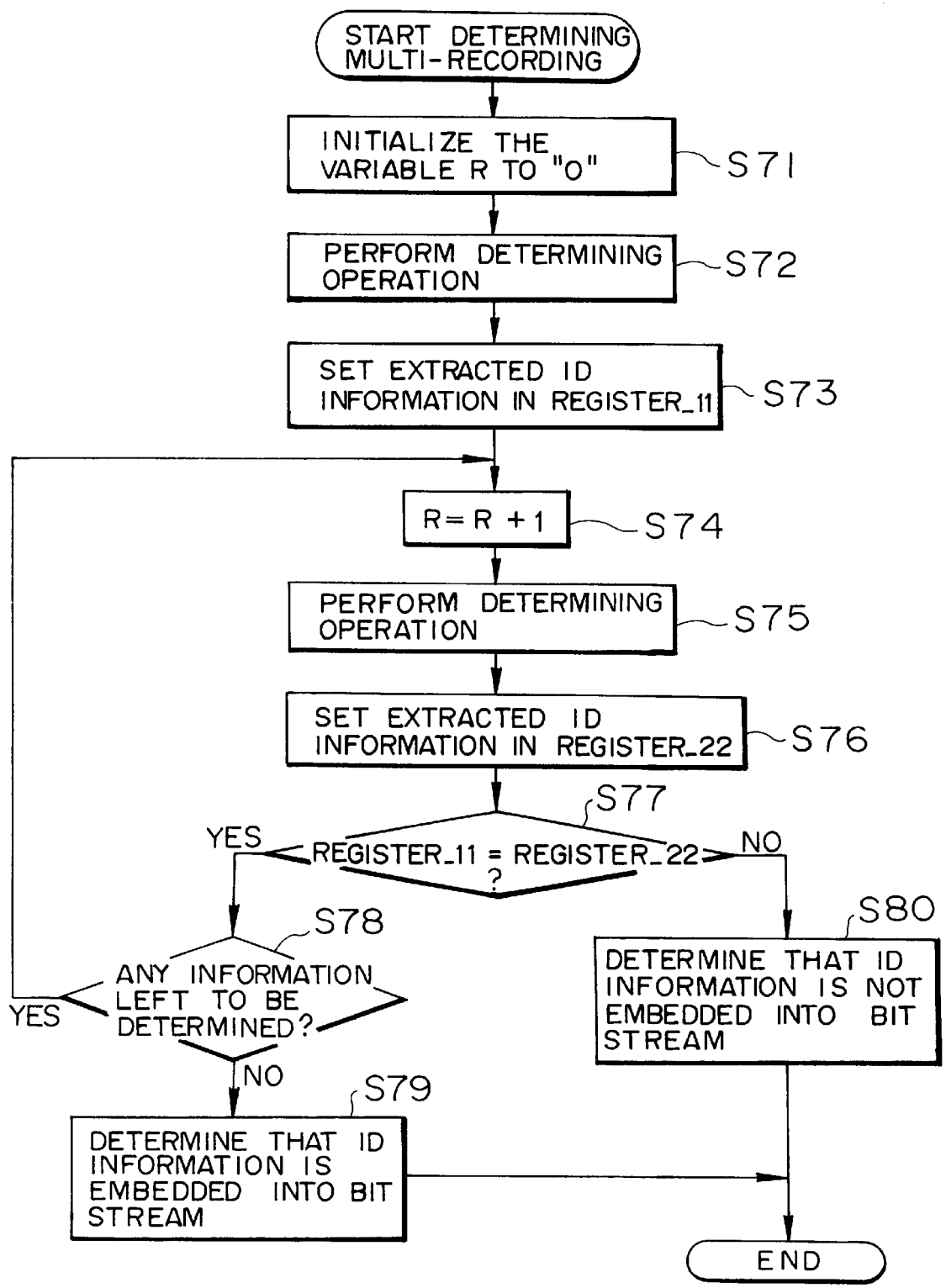
FIG. 19 illustrates the determining operation for identification information which is recorded a plurality of times.

Then, a determining method will be described with reference to FIG. 19. In S71, the variable R is initialized to "0".

The variable R indicates the number of readings of the n-bit ID information from the bit stream. Then, in S72 the determining operation of extracting the n-bit ID information from the bit stream, which has been explained with reference to the flow chart of FIG. 17, is performed. The flow then proceeds to S73 in which the detection circuit 33 sets the n-bit ID information extracted in S72 in the Register__11 of the memory 34.

Subsequently, in S74 the control circuit 39 increments the variable R by "1". In S75, the determining operation, explained while referring to the flow chart of FIG. 17, is again performed. Then, in S76 the n-bit ID information extracted in S75 is set in the Register__22 of the memory 34. It is then determined by the determining circuit 38 in S77 whether the level of the Register__11 equals the level of the Register__22. If the answer in S77 is yes, the control circuit 39 checks in S78 whether there is any information left to be determined. If the answer in S78 is yes, the flow returns to S74 in which the corresponding processing is executed. If it is found in S78 that the information has been completely determined, the flow proceeds to S79 in which the control circuit 39 judges that ID information has been recorded on the input bit stream.

In contrast, if it is found by the determining circuit 38 in S77 that the level of the Register__11 differs from the level of the Register__22, the control circuit 39 judges that there is no ID information embedded into this bit stream.

In this manner, the n-bit ID information is multi-recorded on a bit stream, thereby making it possible to extract the ID information without the aid of information representing whether ID information is recorded.

Although in the foregoing embodiment the DC Differentials are used to record ID information, the Motion__residual (Fixed Length Code: FLC), which is obtained by coding differences of the Motion Vector may be employed. More specifically, according to the MPEG method, the Motion Vector of pictures P and pictures B are detected and then coded. The coded vectors are incorporated into a bit stream and then transmitted. This Motion Vector is represented by the Motion__code used as a Variable Length Code (VLC), as illustrated in FIG. 20, and the Motion__residual as a FLC. The Motion__code indicates a rough level of the Motion Vector, while the Motion__residual designates a correction value representing a detailed level of the Motion Vector. Additionally, the f__code indicates precision (magnification) of the Motion__code.

For example, if the f__code is "1", the Motion__code exhibits 0.5 precision, whereby a sufficiently accurate level can be represented, in which case, the Motion__residual is not used. If the f__code is "2", the Motion$_{code}$ provides the precision represented by integers, and the Motion__residual results in 0.5 precision. Namely, the Motion__residual can be represented by a one-bit FLC indicating "0" or "0.5". Further, if the f__code is "3", the Motion-code exhibits the precision of an integral multiple of 2, and the Motion__residual indicates a two-bit FLC indicating "0", "0.5", "1.0" or "11.5". As in the case of the DC Differential, when the Motion__code is "0", it can be assumed that the Motion__residual does not exist. ID information may be recorded on the above-described Motion__code, which is a FLC, in a manner similar to the foregoing DC Differential.

The Motion__residual is present both in pictures P and pictures B. However, if the Motion__residual of pictures B is employed, pictures B are not used as estimate values in relation to the other pictures, thereby preventing an adverse influence produced by inserting ID information on the other pictures.

Figure 21:
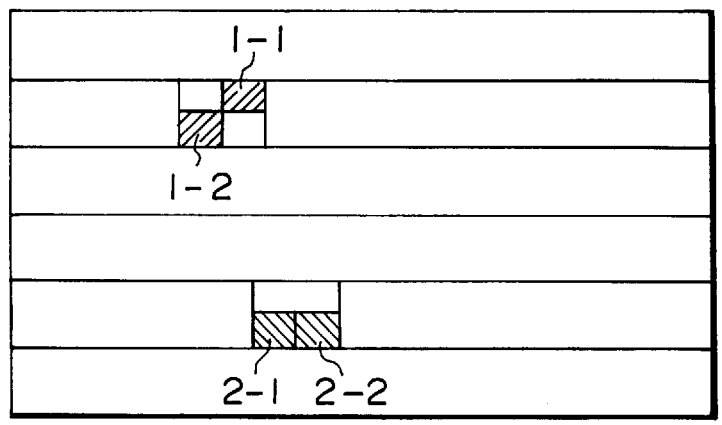
FIG. 21 illustrates a method for recording identification information having a plurality of bits on one picture.

In the aforedescribed embodiment, ID information is formed of n bits. This n-bit data may be, as shown in FIG. 21, disposed within one picture or may be distributed to a plurality of pictures. In FIG. 21, 1-1 and 2-1 represent the first blocks, while 1-2 and 2-2 indicate the second blocks. Correction data for the first block 1-1 is written into the second block 1-2, while correction data for the first block 2-1 is written into the second block 2-2. Naturally, the whole n-bit ID information may be written into one picture.

Additionally, a computation operation, which is employed to determine a predetermined block in the aforedescribed embodiment, may be modified as required. Alternatively, a predetermined block may have been stored in a pattern ROM rather than being computed.

The above-described embodiments offer the following characteristics:

(1) satisfying the requirements as the MPEG Video;

(2) eliminating the necessity of processing by an encoder because ID information is always inserted in standard codes used as a FLC contained in a bit stream;

(3) maintaining the length of a bit stream unchanged since ID information is inserted into a FLC. Otherwise, the insertion of ID information into a VLC would change the length of a bit stream, thereby making it impossible for an encoder to prevent an underflow or an overflow from occurring in a Video Buffering Verifier (VBV) buffer that is considered as a buffer for a decoder;

(4) making noise produced upon a resulting image substantially negligible because a lower-order bit in a FLC is merely overwritten; and (5) making it difficult to distinguish ID information from data since the information is included in data.

Although the present invention has been explained when data is compressed, for example, according to the MPEG method, the present invention is also applicable to the data compression according to the JPEG method (however, Motion-residual is not specified in this method). Further, a method other than the DCT method may be used for the orthogonal transformation of data.

ID information is embedded into data (a bit stream) as discussed above, thereby making it possible to protect digital data transmitted via a network or a recording medium from illegal copying in the following manner.

(1) ID information embedded into data is compared by the data processing unit 93 with ID information read from the ID ROM 96 or the ID card 99. Only when both types of ID information coincide with each other, data is reproduced by the data processing unit 93. This can protect against the use of the data by users other than the user who downloads the data directly from the information provider 111, 114 or 116.

(2) The outputtable times of information (generation management information) from the output terminal of the information terminal unit 81 (or another information terminal unit) has been recorded on data through the aforedescribed processing. The data processing unit 93 extracts the generation management information and ID information from the data input via the input terminal 100 and detects how many times the data has been output through the output terminal 101 (i.e., copied). If the detected number of output times reaches the predetermined number of times recorded in the generation management information, the data processing unit 93 prohibits another output of data from the output terminal 101. In contrast, if the detected number of output times is less than the predetermined number of times, the data processing unit 93 additionally records, according to the aforedescribed recording operation, ID information read from the ID ROM 96 or the ID card 99 on the ID information which has been originally recorded on the data. Thereafter, the data processing unit 93 outputs the data via the output terminal 101. This enables the copyright holder of the data to impose intentional limitations on the number of copyable times of the data.

(3) The data processing unit 93 additionally records ID information stored in the ID ROM 96 or the ID card 99 on the data when the data is input through the input terminal 100 of the information terminal unit 81 (or another information terminal unit) or output via the output terminal 101. Further, the unit 93 displays on the display device 94 the copying history (i.e., ID information) recorded on the data every time an instruction is provided to display on the display device 94 the data input through the input terminal 100. This can explicitly inform the user that the data is protected against illegal copying. Further, the copyright holder is able to trace the history of illegal copying from ID information which is accumulatively recorded.

Although in this embodiment the processing procedure has been explained by the use of the circuit construction, the processing may be executed using a central processing unit (CPU) based on software according to a similar procedure.

As will be clearly understood from the foregoing description, the present invention offers the advantage of protecting against illegal copying because the ID information inherent in a particular information processing unit, which can be distinguished form the other processing units, is recorded on data.

What is claimed is:

1. An information processing unit, comprising:

input means for receiving a data input;

output means for outputting the data input from said input means; and recording means for recording identification information, which serves to distinguish said information processing unit from other information processing units, on the data when the data is input or output, wherein said recording means comprises: designation means for designating a predetermined code from codes, which are always set as fixed length codes, of the data including orthogonal transform coefficients which are transformed into variable length codes and fixed length codes; and writing means for writing said identification information into at least part of the fixed length code designated by said designation means.

2. An information processing unit according to claim 1, further comprising correction means for recording correction data, which compensates for an influence produced by recording said identification information on the predetermined fixed length code, on another fixed length code.

* * * * *